United States Patent
Kim et al.

(10) Patent No.: US 6,487,249 B2
(45) Date of Patent: Nov. 26, 2002

(54) EFFICIENT DOWN CONVERSION SYSTEM FOR 2:1 DECIMATION

(75) Inventors: Hee-Yong Kim, Plainsboro, NJ (US); Michael Iaquinto, Horsham, PA (US); Larry Phillips, Cherry Hill, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/169,296

(22) Filed: Oct. 9, 1998

(65) Prior Publication Data

US 2001/0055340 A1 Dec. 27, 2001

(51) Int. Cl.[7] ............................................. H04N 7/18
(52) U.S. Cl. ........................... 375/240.21; 375/240.15
(58) Field of Search ..................... 375/240.21, 240.16, 375/240.17, 240.15

(56) References Cited

U.S. PATENT DOCUMENTS

| | | | |
|---|---|---|---|
| 4,261,043 A | * | 4/1981 | Robinson et al. ............ 364/725 |
| 4,468,688 A | | 8/1984 | Gabriel et al. |
| 4,472,732 A | | 9/1984 | Bennett et al. |
| 4,536,745 A | | 8/1985 | Yamaguchi et al. |
| 4,602,273 A | * | 7/1986 | Carlson ....................... 348/441 |
| 4,652,908 A | | 3/1987 | Fling et al. |
| 4,774,581 A | | 9/1988 | Shiratsuchi |

(List continued on next page.)

FOREIGN PATENT DOCUMENTS

| | | |
|---|---|---|
| EP | 0 515 143 A2 | 11/1992 |
| EP | 0 598 184 A2 | 5/1994 |
| EP | 0707426 A2 | 4/1996 |
| JP | 05308613 | 11/1993 |
| WO | WO97/01934 | 1/1997 |

OTHER PUBLICATIONS

Aldo Cugnini et al. "MPEG–2 Video Decoder for the Digital HDTV Grand Alliance System" *IEEE Trans–Actions on Consumer Electronics*, vol. 41, Aug., 1995, No. 3. New York, US.

Jill Boyce et al. SDTV Receivers with HDTV Decoding Capability Feb. 1995, ACATS Technical Subgroup Meeting, May 1995, Washington DC.

Jill Boyce et al. Low–Cost all Format ATV Decoding with Improved Quality, Hitachi America, Ltd, Princeton, N.J., 30th SMPTE Advanced Motion Imaging Conference, Paper #11, Feb. 2, 1996.

Jack S. Fuhrer, The all Forman Decoding, Hitachi America, Ltd. Jun. 3, 1996.

Recommended Practices for Video Encoding Using the ATSC Digital Televion.

Standard–Consideration of Downsampling Decoders, SMPTE Jun. 6, 1996 High Performance Multirate Digital Filter, Gennum Corporation, Ontario, Canada, Doc No. 520–64–5, 1/94.

*Primary Examiner*—Andy Rao
(74) *Attorney, Agent, or Firm*—RatnerPrestia

(57) ABSTRACT

An HDTV down conversion system including an apparatus for forming a low resolution 2:1 down converted video signal from an encoded video signal representing a video image. The encoded video signal is a frequency-domain transformed high resolution video signal with motion prediction. The apparatus includes a receiver for receiving encoded video signals as a plurality of high resolution frequency-domain video coefficient values. A down conversion filter receives and weights the high resolution frequency-domain video coefficient values to form a set of low passed frequency-domain video coefficients. An inverse-transform processor transforms the set of frequency-domain video coefficients into a set of pixel values. An averaging filter transforms selected ones of the pixel values in the set of pixel values into averaged pixel values. A decimating processor deletes selected ones of the set of pixel values to provide the low resolution video signal.

21 Claims, 7 Drawing Sheets

U.S. PATENT DOCUMENTS

| | | |
|---|---|---|
| 4,870,661 A | 9/1989 | Yamada et al. |
| 4,908,874 A | 3/1990 | Gabriel |
| 5,028,995 A | 7/1991 | Izawa et al. |
| 5,057,911 A | 10/1991 | Stec et al. |
| 5,262,854 A | 11/1993 | Ng |
| 5,274,372 A | 12/1993 | Luthra et al. |
| 5,331,346 A | 7/1994 | Shields et al. |
| 5,477,397 A | 12/1995 | Naimpally et al. |
| 5,528,301 A | 6/1996 | Hau et al. |
| 5,581,302 A | 12/1996 | Ran et al. |
| 5,737,019 A | 4/1998 | Kim |
| 6,025,878 A * | 2/2000 | Boyce et al. ............... 348/402 |
| 6,175,592 B1 * | 1/2001 | Kim et al. ................. 375/240 |
| 6,184,935 B1 * | 2/2001 | Iaquinto et al. ............ 348/441 |
| 6,222,944 B1 * | 4/2001 | Li et al. ..................... 382/250 |

* cited by examiner

EFFICIENT DOWN CONVERSION SYSTEM FOR 2:1 DECIMATION

FIELD OF THE INVENTION

The present invention relates to a decoder which converts and formats an encoded high resolution video signal, e.g. MPEG-2 encoded video signals, to a decoded lower resolution output video signal, and more specifically to a 2:1 down conversion system for the decoder.

BACKGROUND OF THE INVENTION

In the United States a standard has been proposed for digitally encoded high definition television signals (HDTV). A portion of this standard is essentially the same as the MPEG-2 standard, proposed by the Moving Picture Experts Group (MPEG) of the International Organization for Standardization (ISO). The standard is described in an International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard is actually several different standards. In the MPEG-2 standard, several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level, is intended for coding high-definition television images. Images encoded according to the Main Profile, High Level standard may have as many as 1,152 active lines per image frame and 1,920 pixels per line.

The Main Profile, Main Level standard, on the other hand, defines a maximum picture size of 720 pixels per line and 576 lines per frame. At a frame rate of 30 frames per second, signals encoded according to this standard have a data rate of 720*576*30 or 12,441,600 pixels per second. By contrast, images encoded according to the Main Profile, High Level standard have a maximum data rate of 1,152*1,920*30 or 66,355,200 pixels per second. This data rate is more than five times the data rate of image data encoded according to the Main Profile, Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field, and differing numbers of frames or fields per second. In addition, the basic syntax of the MPEG-2 Main Profile defines the compressed MPEG-2 bit stream representing a sequence of images in five layers, the sequence layer, the group of pictures layer, the picture layer, the slice layer and the macroblock layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

A down conversion system converts a high definition input picture into lower resolution picture for display on a lower resolution monitor. Down conversion of high resolution Main Profile, High Level pictures to Main Profile, Main Level pictures, or other lower resolution picture formats, has gained increased importance for reducing implementation costs of HDTV. Down conversion allows replacement of expensive high definition monitors used with Main Profile, High Level encoded pictures with inexpensive existing monitors which have a lower picture resolution to support, for example, Main Profile, Main Level encoded pictures, such as NTSC or 525 progressive monitors.

To effectively receive the digital images, a decoder should process the video signal information rapidly. To be optimally effective, the coding systems should be relatively inexpensive and yet have sufficient power to decode these digital signals in real time.

One method of down conversion of the prior art simply low pass filters and decimates the decoded high resolution, Main Profile, High Level picture to form an image suitable for display on a conventional television receiver. Consequently, using existing techniques, a decoder employing down conversion may be implemented using a single processor having a complex design, considerable memory, and operating on the spatial domain image at a high data rate to perform this function. The high resolution, and high data rate, however, requires very expensive circuitry, which would be contrary to the implementation of a decoder in a consumer television receiver in which cost is a major factor.

SUMMARY OF THE INVENTION

An apparatus for forming a low resolution 2:1 down converted video signal from an encoded video signal representing a video image. The encoded video signal is a frequency-domain transformed high resolution video signal. The apparatus includes means for receiving encoded video signals as a plurality of high resolution frequency-domain video coefficient values. A down conversion filter means receives and weights selected ones of the high resolution frequency-domain video coefficient values to form a set of frequency-domain video coefficients which an inverse-transform means transforms into a set of pixel values. An averaging filter means transforms selected ones of the pixel values in the set of pixel values into averaged pixel values. A decimating means deletes selected ones of the set of pixel values to provide the low resolution video signal.

BRIEF DESCRIPTION OF THE DRAWINGS

These and other features and advantages of the present invention will become apparent from the following detailed description, taken in conjunction with the accompanying drawings, wherein.

DETAILED DESCRIPTION

I. Decoder Overview

The exemplary embodiment of the invention filters encoded HDTV signals which have been encoded according to the MPEG-2 standard and in particular, the Main Profile, High Level MPEG-2 standard.

The invention described herein, however, is not limited to down conversion filtering of encoded HDTV signals. The filtering method described below may also be used to filter other types of frequency-domain encoded digital signals which may be divided into sections, filtered, and then recombined.

The MPEG-2 Main Profile standard defines a sequence of images in five levels: the sequence level, the group of pictures level, the picture level, the slice level and the macroblock level. Each of these levels may be considered to be a record in a data stream, with the later-listed levels occurring as nested sub-levels in the earlier listed levels. The records for each level include a header section which contains data that is used in decoding its sub-records.

Macroblocks are composed of six blocks, 4 luminance blocks Y and 2 chrominance blocks, Cr and Cb. Each block of the encoded HDTV signal contains data representing 64 respective coefficient values of a two dimensional discrete cosine transform (DCT) representation of 64 picture elements (pixels) in the HDTV image.

In the encoding process, the pixel data is subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs an entropy decoder (e.g. a variable length decoder), an inverse discrete cosine transform processor, a motion compensation processor, and an interpolation filter.

Figure 1:
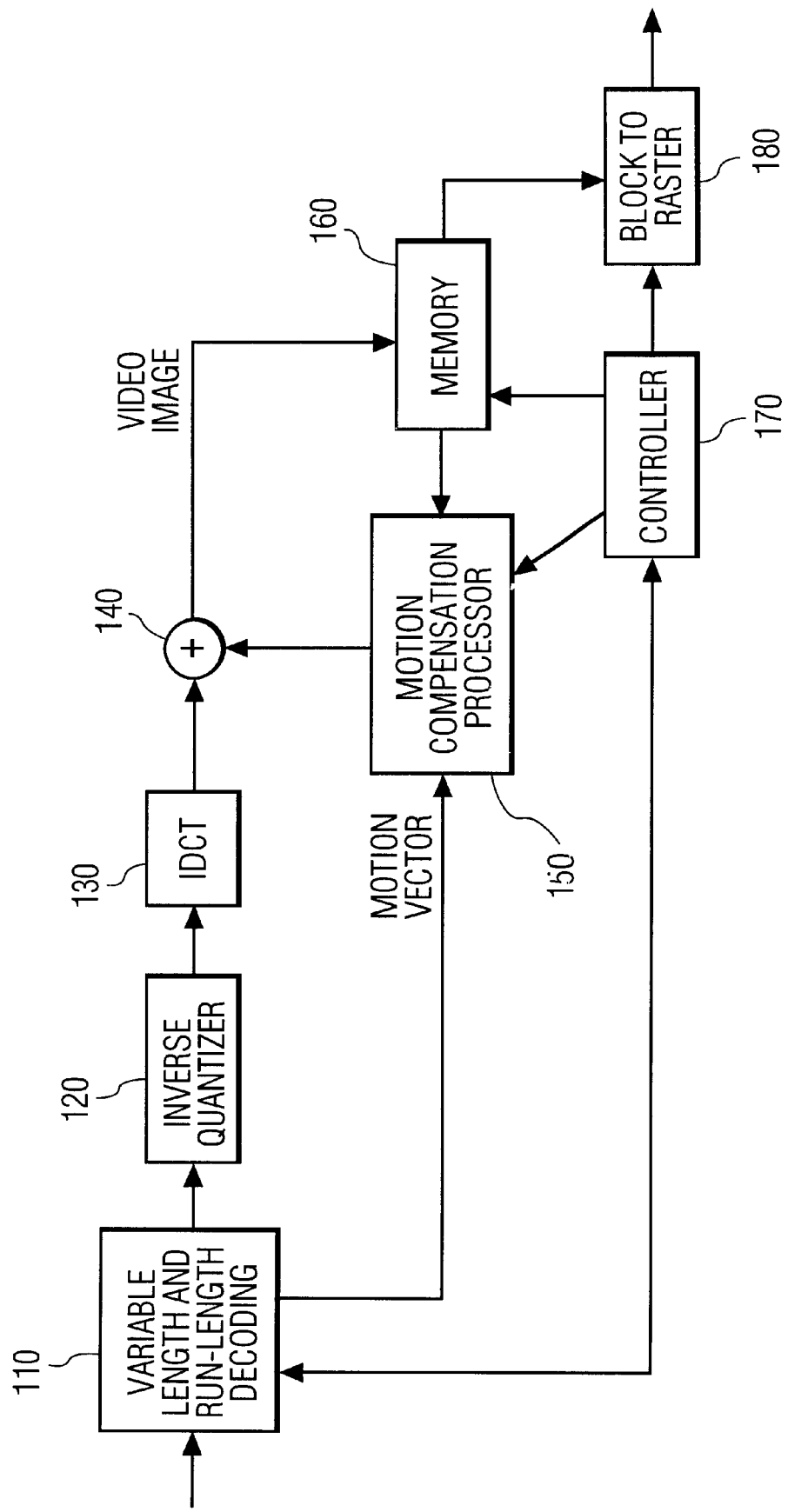
FIG. 1 is a high level block diagram of a video decoding system of the prior art.

FIG. 1 is a high level block diagram of a typical video decoding system of the prior art. The video decoder of the prior art includes an entropy decoder 110, which is usually a variable length decoder and a run length decoder, an inverse quantizer 120, and an inverse discrete cosine transform (IDCT) processor 130. The exemplary system also includes a controller 170 which controls the various components of the decoding system responsive to the control information retrieved from the input bit stream by the entropy decoder 110. For processing of prediction images, the prior art system further includes a memory 160, adder 140, a motion compensation processor 150, and a block to raster converter 180.

The variable length decoder 110 receives the encoded video image signal, and reverses the encoding process to produce control information including motion vectors describing the relative displacement of a matching macroblock in a previously decoded image. This matching macroblock corresponds to a macroblock of the predicted picture that is currently being decoded. The variable length decoder 110 also receives the quantized DCT transform coefficients of the blocks of either the current video image which is referred to as the residual video image, if intraframe encoding is used, or the difference between the current and the predicted video image, which is referred to as the residual video image, if interframe encoding is used. The inverse quantizer 120 receives the quantized DCT transform coefficients and reconstructs the quantized DCT coefficients for a particular macroblock. The quantization matrix to be used for a particular block is received from the variable length decoder 110.

The IDCT processor 130 transforms the reconstructed DCT coefficients to pixel values in the spatial domain (for each block of 8×8 matrix values representing luminance or chrominance components of the macroblock, and for each block of 8×8 matrix values representing the differential luminance or differential chrominance components of the predicted macroblock).

If the current macroblock is not predictively encoded, then the output matrix values are the pixel values of the corresponding macroblock of the current video image. If the macroblock is interframe encoded, the corresponding macroblock of the previous video picture frame (a reference frame) is stored in memory 160 for use by the motion compensation processor 150. The motion compensation processor 150 receives the previous macroblock from memory 160 responsive to the motion vector which is received from the entropy decoder 110. The motion compensation processor 150 then adds the previous macroblock to the current IDCT transformed macroblock (corresponding to a residual component of the present predictively encoded frame) in adder 140 to produce the corresponding macroblock of pixels for the current video image, which is then stored into the memory 160.

II. Down Conversion System

A. Overview

Figure 2A:
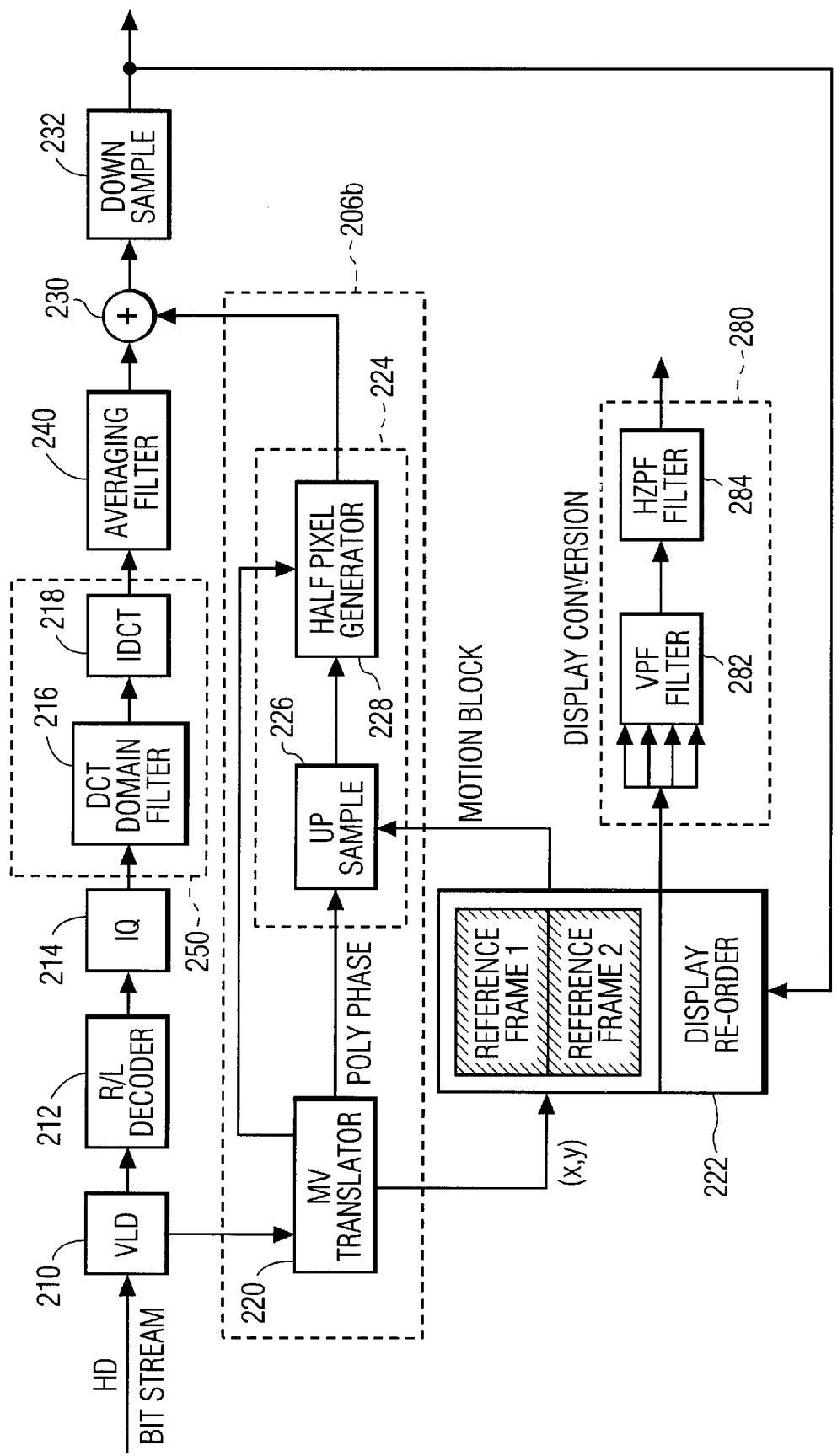
FIG. 2A is a high level block diagram of an exemplary embodiment of a down conversion system.

FIG. 2A is a high level block diagram of an exemplary embodiment of a down conversion system. As shown in FIG. 2A, the down conversion system includes a variable length decoder (VLD) 210, a run-length (R/L) decoder 212, an inverse quantizer 214, and an inverse discrete cosine transform (IDCT) processor 218. In addition, the down conversion system includes a down conversion filter (DCT filter) 216, an averaging filter 240, and a down sampling processor 232 for filtering encoded pictures. While the following describes the exemplary embodiment for a Main Profile, High Level encoded input, the down conversion system may be implemented with any similarly encoded high resolution image bit stream. The combination of the IDCT processor 218 and DCT filter 216 form a DCT processing section 250.

The down conversion system also includes a motion vector (MV) translator 220, a high resolution motion block generator 224 including an up-sampling processor 226 and a half-pixel generator 228 and a reference frame memory 222. The combination of the motion block generator 224 and the motion vector translator 220 form the motion vector processor 206b.

In addition, the system includes a display conversion block 280 including a vertical programmable filter (VPF) 282 and horizontal programmable filter (HZPF) 284. The display conversion block 280 converts downsampled images into images for display on a particular display having a lower resolution.

The down conversion filter 216 performs a lowpass filtering of the high resolution (e.g. Main Profile, High Level DCT) coefficients in the frequency domain. The down sampling processor 232 eliminates spatial pixel values by decimation of the lowpass filtered Main Profile, High Level picture to produce a set of pixel values which can be displayed on a monitor having lower resolution than that required to display a Main Profile, High Level picture. The exemplary reference frame memory 222 stores the spatial pixel values corresponding to at least one previously decoded reference frame having a resolution corresponding to the down-sampled picture. For non-intra macroblock encoding, the MV translator 220 scales the motion vectors for each block of the received picture consistent with the reduction in resolution, and the low resolution motion block generator 224 receives the decimated motion blocks provided by the reference frame memory 222, up-samples these motion blocks and generates half pixel values to provide motion blocks at the half pixel accuracy which exhibit good spatial correspondence to the decoded and filtered differential pixel blocks.

The operation of this exemplary embodiment of a down conversion system for intra-macroblock encoding is now described. The Main Profile, High Level bit-stream is received and decoded by VLD 210. In addition to header information used by the HDTV system, the VLD 210 provides DCT coefficients for each block and macroblock, and motion vector information. The DCT coefficients are run length decoded in the R/L decoder 212 and inverse quantized by the inverse quantizer 214. The VLD 210 and R/L decoder 212 correspond to the entropy decoder 110 of FIG. 1.

Since the received video image represented by the DCT coefficients is a high resolution picture, the DCT coefficients of each block are lowpass filtered before decimation of the high resolution video image. The inverse quantizer 214 provides the DCT coefficients to the DCT filter 216 which performs a lowpass filtering in the frequency domain by weighting the DCT coefficients with predetermined filter coefficient values before providing them to the IDCT processor 218. In an exemplary embodiment, this filter operation is performed on a block by block basis.

The IDCT processor 218 provides spatial pixel sample values by performing an inverse discrete cosine transform of the filtered DCT coefficients. The averaging filter 240 averages the spatial pixel sample values. The down sampling processor 232 reduces the picture sample size by eliminating spatial pixel sample values according to a predetermined decimation ratio; therefore, storing the lower resolution picture uses a smaller frame memory 222 compared to that which would be needed to store the higher resolution Main Profile, High Level picture.

The operation of this exemplary embodiment of a down conversion system for non-intra macroblock encoding is now described. In this exemplary embodiment, following the MPEG standard, the DCT coefficients of the current received image represent the DCT coefficients of the residual components of the predicted image macroblocks. The horizontal components of the motion vectors are scaled since the low resolution reference pictures of previous frames stored in memory do not have the same number of pixels as the high resolution predicted frame (Main Profile, High Level).

Referring to FIG. 2A, the motion vectors of the Main Profile, High Level bit stream provided by the VLD 210 are provided to the MV translator 220. Each motion vector is scaled by the MV translator 220 to reference the appropriate prediction block of the reference frame of a previous image stored in reference frame memory 222. The size (number of pixel values) in the retrieved block is smaller than a block of the corresponding high resolution block used to encode the current image; consequently, the retrieved block is up-sampled to form a prediction block having the same number of pixels as the residual block provided by the IDCT processor 218.

The prediction block is up-sampled by the up-sampling processor 226 responsive to a control signal from the MV translator 220 to generate a block corresponding to the original high resolution block of pixels. Then, half pixel values are generated, if indicated by the motion vector for the up-sampled prediction block in the half-pixel generator 228, to ensure proper spatial alignment of the prediction block. The up-sampled and aligned prediction block is added in adder 230 to the current filtered block, which is, for this example, the reduced resolution residual component from the predicted block. All the processing is done on a macroblock by macroblock basis. After the motion compensation process is complete for the current macroblock in the upsampling domain, the reconstructed macroblock is decimated accordingly in the down sampling processor 232. This process does not reduce the resolution of the image but simply removes redundant pixels from the low resolution filtered image.

Once the downsampled macroblocks for an image are available, the display conversion block 280 adjusts the image for display on a low resolution television display by filtering the vertical and horizontal components of the downsampled image in the VPF 282 and the HZPF 284 respectively.

B. Averaging Filter

The DCT filter 216 of FIG. 2A performs lowpass filtering in the frequency domain by weighting the DCT coefficients with predetermined filter coefficient values before providing them to the IDCT processor 218. The lowpass filtering performed by the DCT filter 216 reduces aliasing distortion in an output image.

In an exemplary embodiment of the present invention, the DCT filter 216 performs this filtering on an intra-block basis without having coefficient values corresponding to blocks adjacent to the block being filtered. This may result in an output image including down conversion artifacts due to non-smooth filtering at block boundaries. These down conversion artifacts may be visible in an output image, particularly when the original image consists of a moving scene having fine detail and when there is slow panning and zooming.

In an exemplary embodiment, the DCT filter 216 is not linear shift invariant and is equivalent to a block mirror filter in the spatial domain. This block mirror filter functions as a FIR filter at pixels in the middle of the block of DCT coefficients, but differs at block boundaries because it assumes left and right pixels beyond block boundaries as mirrored and then filters these input pixels to get a low pass output. This exemplary embodiment also may result in an output image including down conversion artifacts due to non-smooth filtering at block boundaries.

The averaging filter 240 shown in FIG. 2A is linear shift invariant and may be designed to reduce these down conversion artifacts. In an exemplary embodiment of a 2:1 down conversion system, the averaging filter 240 is a two tap filter which averages two pixels after the IDCT processor 218 has transformed the reconstructed DCT coefficients to pixel values in the spatial domain.

An exemplary embodiment is described below for a case where DCT encoding is performed on 8×8 pixel blocks and where the averaging filter 240 performs intra-block filtering for a horizontal 2:1 decimation down conversion system. As known to those skilled in the art, the teachings of this invention may be applied to other dimensions.

Labeling a horizontal row of input pixels of the 8×8 block as $x=[x_0\ x_1\ x_2\ x_3\ x_4\ x_5\ x_6\ x_7]$, and labeling a corresponding horizontal row of output pixels of the 8×8 block as $A=[\alpha_0\ \alpha_1\ \alpha_2\ \alpha_3\ \alpha_4\ \alpha_5\ \alpha_6\ \alpha_7]$, the output pixels A are defined by equations (1) through (4) below:

$$\alpha_0 = (x_0 + x_1)/2; \quad (1)$$

$$\alpha_2 = (x_2 + x_3)/2; \quad (2)$$

$$\alpha_4 = (x_4 + x_5)/2; \quad (3)$$

and $$\alpha_6 = (x_6 + x_7)/2; \quad (4)$$

Figures 2B, 3A:
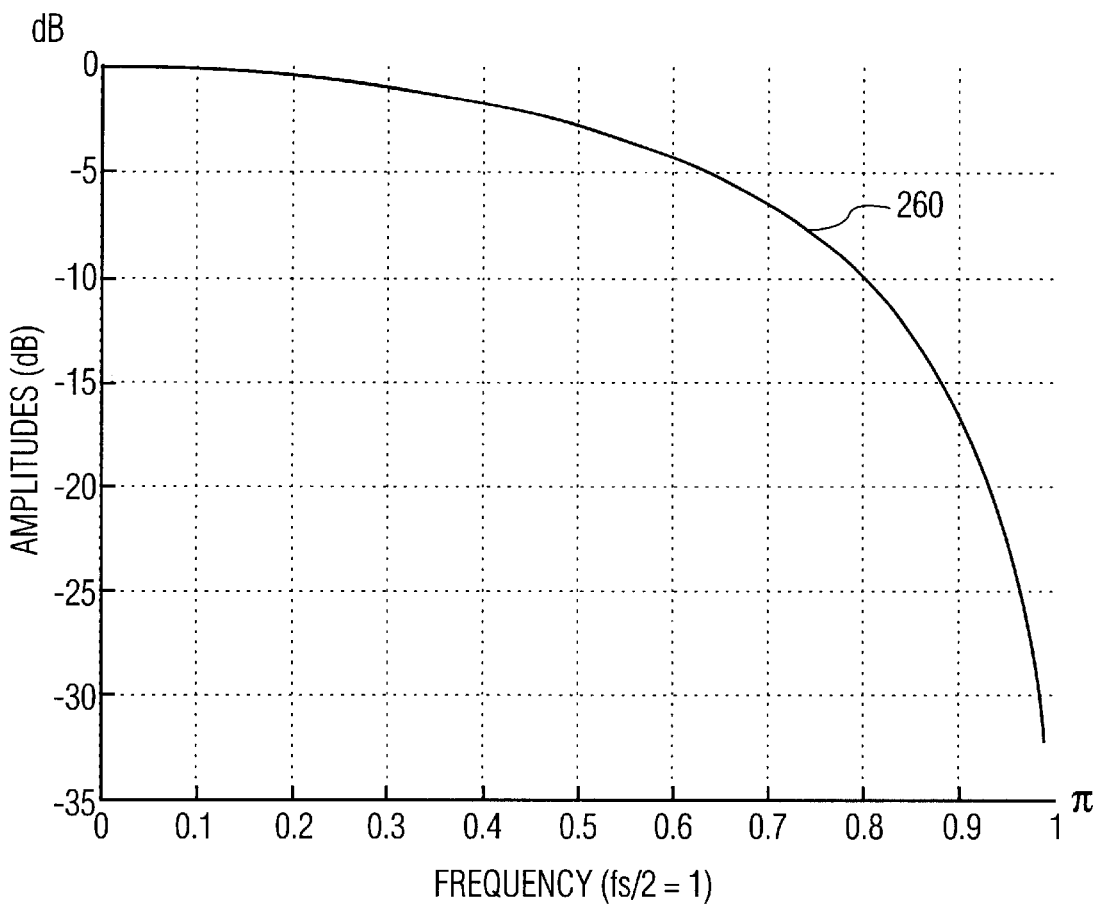
FIG. 2B shows the frequency response characteristic of an averaging filter according to an exemplary embodiment of the invention.
FIG. 3A illustrates subpixel positions and corresponding predicted pixels for an exemplary embodiment of a 2:1 down conversion system.

The frequency response (dB vs. frequency, where π corresponds to one-half of the sampling frequency) of a filter characterized by equations (1) through (4) above is illustrated by curve 260 in FIG. 2B.

In the above example, since $\alpha_1, \alpha_3, \alpha_5,$ and $\alpha_7$ are thrown out by the down sampling processor 232, the filter can be implemented as either of the following characteristics in equations (5) and (6) where N is the number of pixels in a row and would be 8 in the example above:

$$\alpha_{2i} = \frac{x_{2i} + x_{2i+1}}{2} \text{ for } i = 0, 1, \ldots, (N/2)-1 \text{ or} \quad (5)$$

$$\alpha_i = \frac{x_i + x_{i+1}}{2} \text{ for } i = 0, 1, \ldots, N-1. \quad (6)$$

C. Macroblock Prediction

Since the reference frames of previous images are down sized, the received motion vectors pointing to these frames may also be translated according to the conversion ratio. The following describes the motion translation for the luminance block, for example, in the horizontal direction. One skilled in the art would easily extend the following discussion to motion translation in the vertical direction if used. Denoting x and y as the current macroblock address in the original image frame, Dx as the horizontal decimation factor and $mv_x$ as the half pixel horizontal motion vector of the original image frame, the address of the top left pixel of the motion block in the original image frame, denoted as XH in the half pixel unit, is given by (7):

$$XH = 2x + mv_x \quad (7)$$

The pixel corresponding to the motion block starts in the down-sampled image, whose address is denoted as x* and y* in the pixel unit given in (8).

$$x^* = \frac{XH}{2 \cdot Dx}; y^* = y \quad (8)$$

Because the exemplary DCT filter 216 and down sampling processor 232 only reduce the horizontal components of the image, the vertical component of the motion vector is not affected. For the chrominance, the motion vector is a half of a luminance motion vector in the original picture. Therefore, definitions for translating the chrominance motion vector may also use the two equations (7) and (8).

Motion prediction is done by a two step process: first, pixel accuracy motion estimation in the original image frame restored by up-sampling the down-sampled image frame in the up-sampling processor 226 of FIG. 2A, then the half-pixel generator 228 performs a half pixel motion estimation by averaging the nearest pixel values.

Subpixels in a decimated picture, which correspond to pixels in an original picture, are interpolated, for example, using an up-sampling polyphase filter in the up-sampling processor 226, which gives a motion prediction in the original picture. The motion prediction is added in adder 230 to an output of the IDCT processor 218. Since the output values of the adder 230 correspond to a reduced resolution image in the original picture format, these values may be downsampled for display on a display having a lower resolution. Downsampling in the down sampling processor 232 is substantially equivalent to subsampling of an image frame, but adjustments may be made based upon the conversion ratio.

After acquiring the correct motion prediction block from the down-sampled image, up-sampling is needed to get the corresponding prediction block in the original picture. Consequently, subpixel accuracy in motion block prediction is desirable in the down sampled picture. The subpixel which is a first pixel required by the motion vector, in addition to the down-sampled motion block, is determined. Then, subsequent subpixel positions are determined using modulo arithmetic as described in the following. The subpixel positions are denoted as $x_S$ as given in (9):

$$X_s = \left(\frac{XH}{2}\right)\%(Dx) \quad (9)$$

where "%" represents modulo division.

For example, the ranges of $x_S$ are 0, 1 for 2:1 up-sampling. FIG. 3A shows subpixel positions and corresponding 17 predicted pixels for 2:1 upsampling, and Table 1 gives the legend for FIG. 3A.

TABLE 1

| Symbol | Pixel |
|---|---|
| ● | Downsampled Pixel |
| Δ | Upsampled Pixel |
| ○ | Prediction Pixel |
| □ | Extra Right and Left Pixels for Upsampling |

As previously described, the up-sampling filters may be up-sampling polyphase filters, and Table 2A gives characteristics of an up-sampling polyphase interpolation filter.

TABLE 2A

| | 2:1 Up-sampling |
|---|---|
| Number of Polyphase Filters | 2 |
| Number of Taps | 5 |
| Maximum number of horizontal downsampled pixels | 13 |

Tables 2B below shows polyphase filter coefficients for an exemplary 2:1 up-sampling polyphase filter.

TABLE 2B

2:1 Up-sampling Filter

|  | Phase 0 | Phase 1 |
|---|---|---|
| Double Precision | 0.0110396839260 | −0.1433363887113 |
|  | 0.0283886402920 | 0.6433363887113 |
|  | 0.9211433515636 | 0.6433363887113 |
|  | 0.0283886402920 | −0.1433363887113 |
|  | 0.0110396839260 | 0.0000000000000 |
| Fixed Point | 0.01718750 (3) | −0.14453125 (−37) |
| (9 bits) | 0.02734375 (7) | 0.64453125 (165) |
|  | 0.92187500 (236) | 0.64453125 (165) |
|  | 0.02734375 (7) | −0.14453125 (−37) |
|  | 0.01718750 (3) | 0.00000000 (0) |

In a fixed point representation, the numbers in parenthesis of Table 2B are 2's complement representations in 9 bits with the corresponding double precision numbers on the left. Depending upon the subpixel position of the motion prediction block in the downsampled reference image frame, one corresponding phase of the polyphase interpolation filter is used. Also, in an exemplary embodiment, more pixels on the left and right are needed to interpolate 17 horizontal pixels in the downsampled image frame. However, when up-sampling, 9 horizontal pixels are needed to produce the corresponding motion prediction block values because an up-sampling filter requires more left and right pixels outside of the boundary for the filter to operate. Since the exemplary embodiment employs half pixel motion estimation, 17 pixels are needed to get 16 half pixels which can be either the first 16 integer pixels or the average values of nearest two pixel samples. A half pixel motion generator takes care of this. Table 3 illustrates mapping between subpixel positions and polyphase filter elements, and a number of left pixels which are needed in addition for the up-sampling process.

TABLE 3

| | Sub Pixel Position | Polyphase | No. of Extra Left Pixels | Coordinate Change |
|---|---|---|---|---|
| 2:1 Up-sampling | 0 | 0 | 2 | x -> x - 2 |
|  | 1 | 1 | 2 | x -> x - 2 |

Figure 3B:
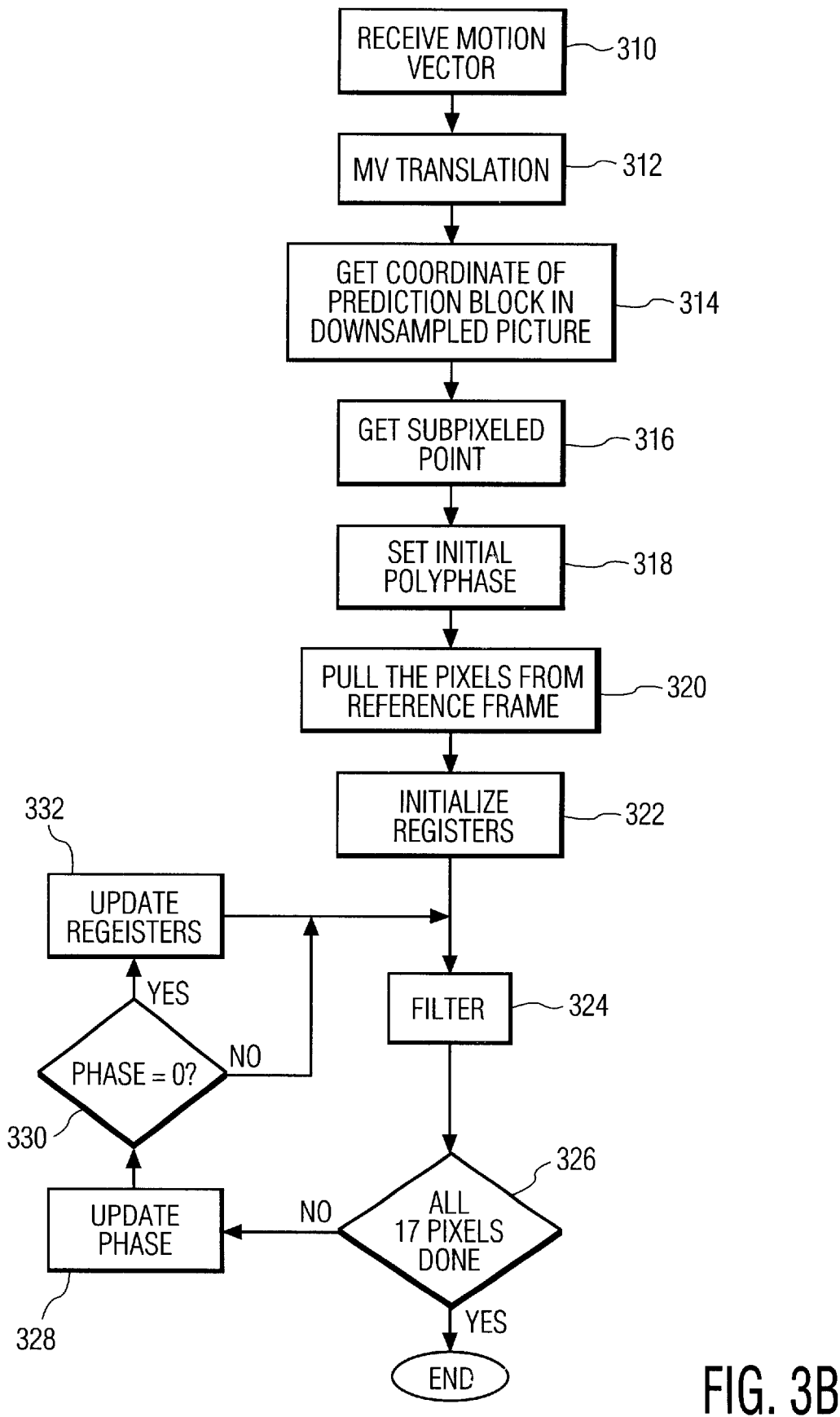
FIG. 3B shows the up-sampling process which is performed for each row of an input macroblock for an exemplary down conversion system.

FIG. 3B summarizes the up-sampling process which is performed for each row of an input macroblock. First, in step 310, the motion vector for the block of the input image frame being processed is received. At step 312, the motion vector is translated to correspond to the downsampled reference frame in memory. At step 314, the scaled motion vector is used to retrieve the coordinates of the prediction block stored in frame memory. At step 316 the subpixel point for the block is determined and the initial polyphase filter values for up-sampling are then retrieved at step 318. The identified pixels for the prediction block of the stored downsampled reference frame are then retrieved from memory at step 320.

Before the first pass at the filtering step 324, the registers are initialized at step 322, which for the exemplary embodiment entails loading the registers with the initial 3 or 5 pixel values. Then, after filtering step 324, the process determines at step 326 whether all pixels have been processed. In the exemplary embodiment 17 pixels are processed. If all pixels have been processed, the up-sampled block is complete. If all pixels have not been processed, the phase is updated at step 328, and the phase is checked, for the 0 value. If the phase is zero, the registers must be updated for the next set of polyphase filter coefficients. Updating registers step 332 then simply updates the input pixels. In an exceptional case where the left-most pixel is outside of the block boundary, a previous pixel value may be repeated.

When the coding structure consists of many predicted frames between intra-coded frames, reproduction of a slow moving original image in a down conversion picture may result in the predicted frames having motion artifacts resulting in the reproduced down conversion picture having a reduced resolution and/or motion ahead or behind the original image. When the next intra-coded frame is displayed, the difference between the down converted predicted picture having motion artifacts and an accurately reproduced picture will result in non-smooth motion to a viewer. For example, if predicted frames are ahead of the motion of the original image, the next intra-coded frame may give a viewer the impression that the motion is now going backward.

In an exemplary embodiment, the down conversion system of FIG. 2A includes an up-sampling processor 226 which uses a Lagrangian filter to interpolate the pixels decimated by the down sampling processor 232. Lagrangian interpolation is well known to those skilled in the art and is taught by Atkinson, *An Introduction to Numerical Analysis*, 107–10 (1978), which is incorporated herein by reference. Using a Lagrangian filter reduces motion artifacts described above compared to using an equi-ripple filter.

D. DCT Domain Filtering Employing Weighting of DCT Coefficients

The exemplary embodiment of the down conversion system includes the DCT filter 216 processing the DCT coefficients in the frequency domain, which replaces a lowpass filter in the spatial domain. There are several advantages in DCT domain filtering instead of spatial domain filtering for DCT coded pictures, such as contemplated by the MPEG or JPEG standards. Most notably, a DCT domain filter is computationally more efficient and requires less hardware than a spatial domain filter applied to the spatial pixels. For example, a spatial filter having N taps may use as many as N multiplications and additions for each spatial pixel sample value. This compares to only one multiplication in the DCT domain filter.

The simplest DCT domain filter is a truncation of the high frequency DCT coefficients. However, truncation of high frequency DCT coefficients does not result in a smooth filter and has drawbacks such as "ringing" near edges in the decoded picture. The DCT domain lowpass filter of the exemplary embodiment of the invention is derived from a block mirror filter in the spatial domain. The filter coefficient values for the block mirror filter are, for example, optimized in the spatial domain, and these values are then converted into coefficients of the DCT domain filter.

Although the exemplary embodiment shows DCT domain filtering in only the horizontal direction, DCT domain filtering can be done in either the horizontal or the vertical direction or both by combining horizontal and vertical filters.

E. DCT Domain Filter Coefficients

One exemplary filter of the present invention is derived from two constraints: first, the filter processes image data on a block by block basis for each block of the image without using information from other blocks of the same picture or from previous pictures; and second, the filter reduces visibility of block boundaries which occur when the filter processes boundary pixel values.

According to the first constraint, in the DCT based compression of an MPEG image sequence, for example, blocks of N×N DCT coefficients yield blocks of N×N spatial pixel values. Consequently, an exemplary embodiment of the present invention implements a DCT domain filter which only processes blocks of the currently received picture.

According to the second constraint, if the filter is simply applied to a block of spatial pixel values, there is a transition of filtering on the block boundary which is caused by an insufficient number spatial pixel values beyond the boundary to fill the residual of the filter. That is to say, the edge of a block cannot be properly filtered because the N-tap filter has respective input pixels for only N/2 or for (N/2)−1 taps depending upon whether N is even or odd. The remaining input pixels are beyond the boundary of the block. Several methods of supplying pixel values exist: 1) repeat a predetermined constant pixel value beyond a boundary; 2) repeat the same pixel value as the boundary pixel value; and 3) mirror the pixel values of the block to form previous and subsequent blocks of pixel values adjacent to the processed block. Without prior information on the contents of the previous or subsequent block, the mirroring method is considered as a preferred method. Therefore, an embodiment of the present invention employs this mirroring method for the filter and is termed a "block mirror filter."

The following describes an exemplary embodiment which implements a horizontal block mirror filter that lowpass filters 8 input spatial pixel sample values of a block. If the size of the input block is an 8×8 block matrix of pixel sample values, then a horizontal filtering can be done by applying the block mirror filter to each row of 8 pixel sample values. It will be apparent to one skilled in the art that the filtering process can be implemented by applying the filter coefficients columnwise of the block matrix, or that multidimensional filtering may be accomplished by filtering of the rows and then filtering the columns of the block matrix.

Figure 4:
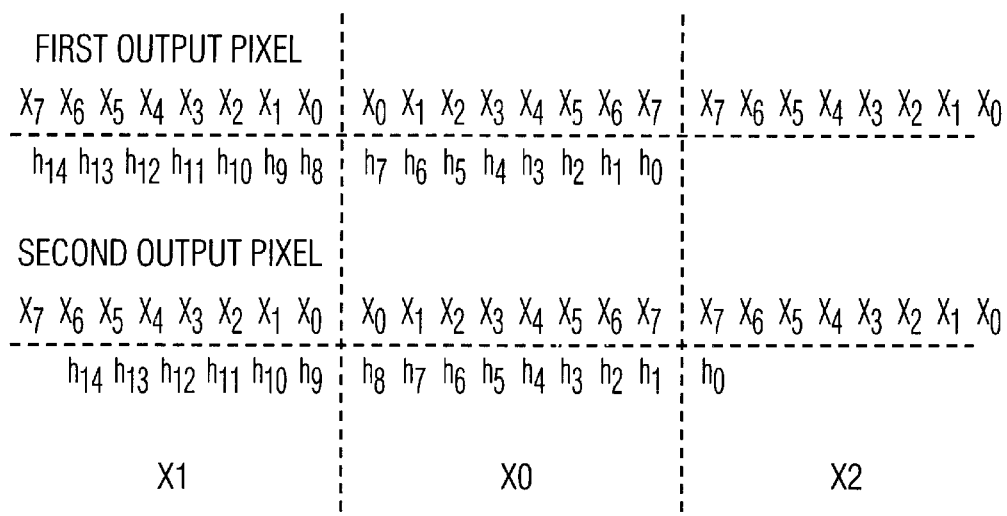
FIG. 4 illustrates the multiplication pairs for the first and second output pixel values of an exemplary embodiment of a block mirror filter.

FIG. 4 shows the correspondence between the input pixel values $x_0$ through $x_7$ (group X0) for an exemplary mirror filter for 8 input pixels which employs a 15 tap spatial filter represented by tap values $h_0$ through $h_{14}$. The input pixels are mirrored on the left side of group X0, shown as group X1, and on the right side of group X0, shown as group X2. The output pixel value of the filter is the sum of 15 multiplications of the filter tap values with the corresponding pixel sample values. FIG. 4 illustrates the multiplication pairs for the first and second output pixel values.

F. Exemplary Embodiment of the Block Mirror Filter

One embodiment of the exemplary block mirror filtering of the present invention is derived as by the following steps: 1) a one dimensional lowpass symmetric filter is chosen with an odd number of taps, which is less than 2N taps; 2) the filter coefficients are increased to 2N values by padding with zero's; 3) the filter coefficients are rearranged so that the original middle coefficient goes to the zeroth position by a left circular shift; 4) the DFT coefficients of the rearranged filter coefficients are determined; 5) the DCT filter coefficients are multiplied with the real number DFT coefficients of the input block; and 6) the inverse discrete cosine transform (IDCT) of the filtered DCT coefficients is performed by multiplying by IDCT coefficients to provide a block of lowpass-filtered pixels prepared for decimation.

The cutoff frequency of the lowpass filter is determined by the decimation ratio. For one exemplary embodiment, the cutoff frequency is $\pi/2$ for a 2:1 decimation, where $\pi$ is one-half the sampling frequency.

A DCT domain filter in MPEG and JPEG decoders allows memory requirements to be reduced because the inverse quantizer and IDCT processing of blocks already exists in the decoder of the prior art, and only the additional scalar multiplication of DCT coefficients by the DCT domain filter coefficients is required. Therefore, a separate DCT domain filter block multiplication is not physically required in a particular implementation; another embodiment of the present invention simply combines the DCT domain filter coefficients with the IDCT processing coefficients.

For the exemplary down conversion system of the present invention, the horizontal filtering and decimations of the DCT coefficients were considered; and the following is an exemplary implementation for 1280H by 720V progressive to 640H by 720V progressive conversion (Horizontal 2:1 Decimation).

Table 4 shows the DCT block mirror filter (weighting) coefficients. As taught by Kim et. al., "DCT Domain Filter For ATV Down Conversion", IEEE Trans. on Consumer Electronics, Vol. 43 (4) 1074–8 (1997), a block mirror filter in the spatial domain can be implemented in the DCT domain by weighting DCT coefficients. In Table 4 the numbers in the parenthesis are 10 bit 2's complementary representations. The "*" of Table 4 implies an out of bound value for the 10 bit 2's complement representation because the value is more than 1; however, as is known by one skilled in the art, the multiplication of the column coefficients of the block by the value indicated by the * can be easily implemented by adding the coefficient value to the coefficient multiplied by the fractional value (remainder) of the filter value.

TABLE 4

| 2:1 Decimation | |
|---|---|
| H[0] | 1.0000000000000000 (511) |
| H[1] | 1.0169628157945179 (*) |
| H[2] | 1.0000000000000000 (511) |
| H[3] | 0.82247656390475166 (421) |
| H[4] | 0.46728234862006007 (239) |
| H[5] | 0.10634261847436199 (54) |
| H[6] | −0.052131780559049545 (−27) |
| H[7] | −0.003489737967467715 (−2) |

These horizontal DCT filter coefficients weight each column in the block of 8×8 DCT coefficients of the encoded video image. For example, the DCT coefficients of column zero are weighted by H[0], and the DCT coefficients of first column is weighted by H[1] and so on.

Figure 5:
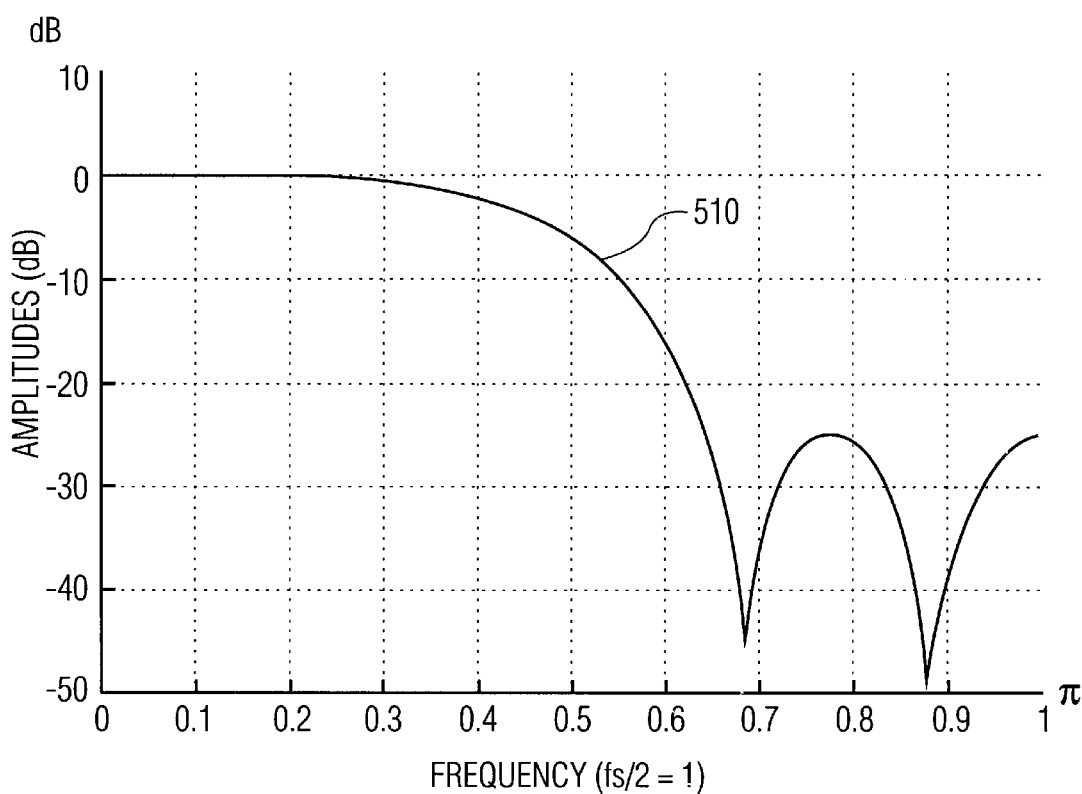
FIG. 5 shows the frequency response characteristic of a down-conversion filter according to an exemplary embodiment of the invention.
Figure 6:
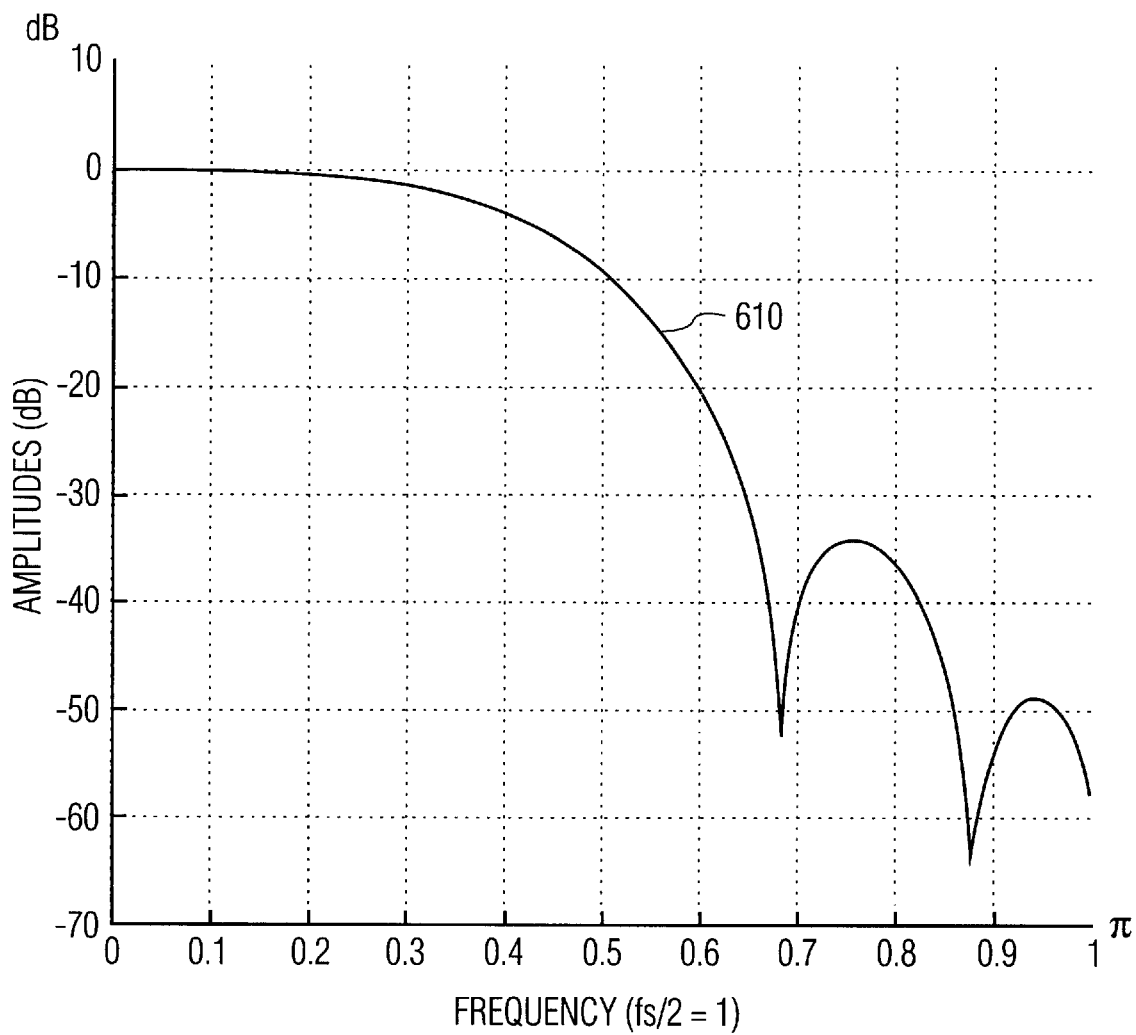
FIG. 6 shows the frequency response characteristic of a cascaded averaging filter and down-conversion filter according to an exemplary embodiment of the invention.

The frequency response (dB vs. frequency) of a down conversion filter characterized by the coefficients in Table 4 is illustrated by curve 510 in FIG. 5. The is frequency response (dB vs. frequency) of an averaging filter characterized by equations (1) through (4) cascaded with a down conversion filter characterized by the coefficients in Table 4 is illustrated by curve 610 in FIG. 6.

The above discussion illustrates a horizontal filter implementation using a one-dimensional DCT. As is known in the digital signal processing art, such processing can be extended to two-dimensional systems. For a two-dimensional system, the input sequence is now represented as a matrix of values, showing the sequence to be periodic in the column sequence with period M, and periodic in the row sequence with period N, N and M being integers. A two-dimensional DCT can be implemented as a one dimensional DCT performed on the columns of the input sequence, and then a second one dimensional DCT performed on the rows of the DCT processed input sequence. Also, as is known in the art, a two-dimensional IDCT can be implemented as a single process.

G. Down Sampling

Figure 7:
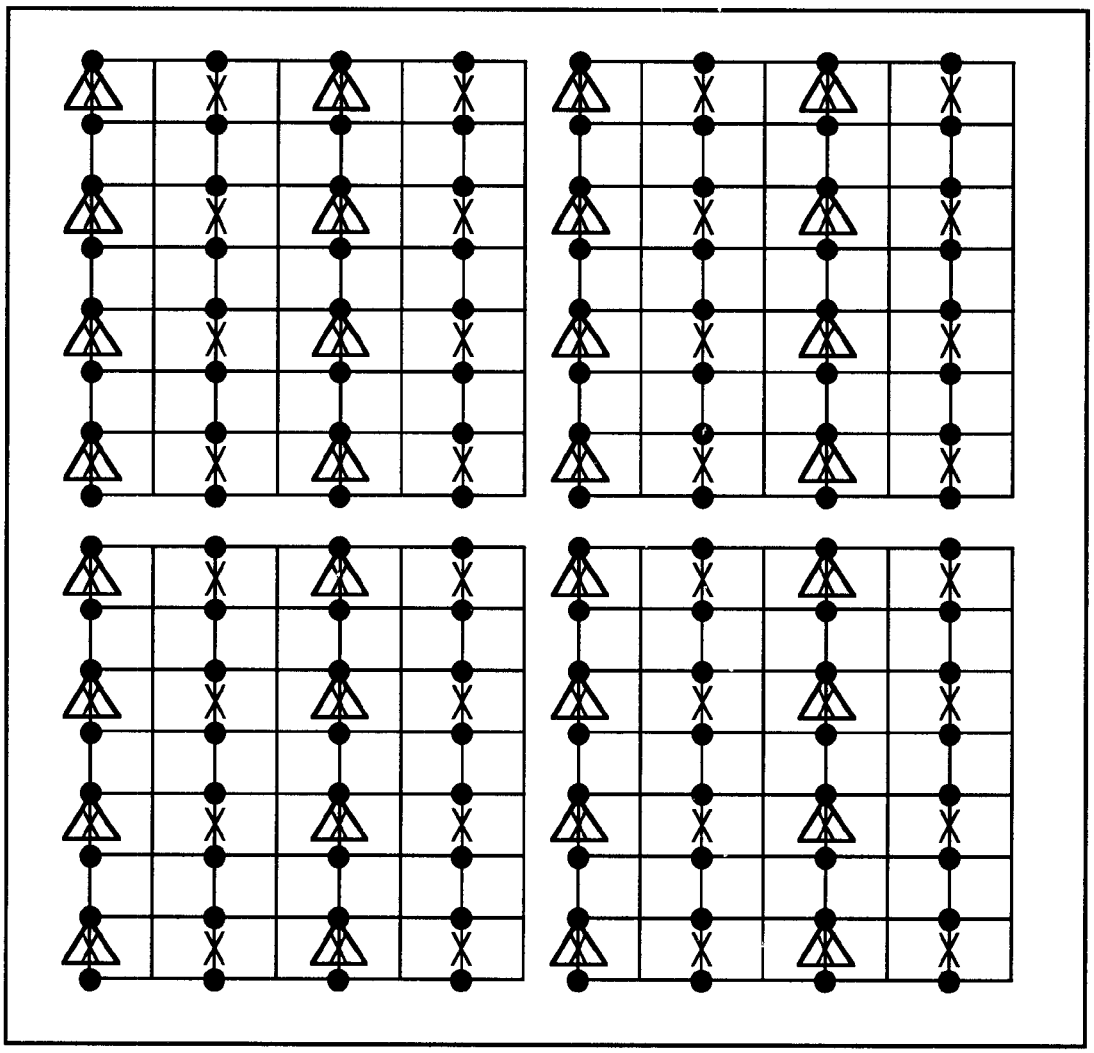
FIG. 7 shows input and decimated output pixels for 4:2:0 video signal using 2:1 decimation.

Down sampling is accomplished by the down sampling processor 232 to reduce the number of pixels in the down-converted image. FIG. 7 shows the input and decimated output pixels for 4:2:0 chrominance type 2:1 decimation. Table 5 gives the legend identification for the Luminance and Chrominance pixels of FIG. 7. The pixel positions before and after the down conversion of FIG. 7 are for the progressive (2:1 decimation) case.

TABLE 5

| Symbol | Pixel |
|---|---|
| + | Luminance Before Decimation |
| x | Chrominance Before Decimation |
| ● | Luminance After decimation |
| Δ | Chrominance After Decimation |

For downsampling of the progressive format image, which may be the conversion from a 1280 by 720 pixel size to a 640 by 720 pixel size, the luminance signal is sub-sampled for every second sample horizontally. In other words, every second pixel is decimated on the horizontal axis. For the chrominance signal, the down-sampled pixel is just a half pixel below the original pixel. The pixels in the original macroblock and the decimated pixels are shown in FIG. 7.

While exemplary embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the scope of the invention.

What is claimed:

1. An apparatus for forming a low resolution video signal from an encoded video signal representing a video image, the encoded video signal being a frequency-domain transformed high resolution video signal, the apparatus comprising:
   receiving mean for receiving the encoded video signal as a plurality of high resolution frequency domain video coefficient values;
   down-conversion filter means for receiving and weighting the plurality of high resolution frequency-domain video coefficient values to form a set of a respective plurality of low pass filtered frequency-domain video coefficients;
   inverse-transform means for receiving and transforming the set of low pass filter frequency-domain video coefficients into a first set of pixel values;
   averaging filter means for receiving the first set of pixel values and transforming selected ones of the pixel values in the first set of pixel values into averaged pixel values to provide a second set of pixel values including the averaged pixel values; and
   decimating means for deleting selected ones of the pixel values in the second set of pixel values to provide the low resolution video signal.

2. An apparatus for forming a low resolution video signal according to claim 1, wherein the averaging filter means transforms all of the pixel values in the first set of pixel values into averaged pixel values.

3. An apparatus for forming a low resolution video signal according to claim 1, wherein the averaging filter means transforms only successive pairs of the pixel values in the first set of pixel values into averaged pixel values and the second set of pixel values includes only the averaged pixel values and thus, the averaging means includes the decimating means.

4. An apparatus for forming a low resolution video signal according to claim 1, wherein the encoded video signal represents a residual video image with motion prediction, the apparatus further comprising:
   summing means for adding a motion compensated video signal component of a previous frame to the second set of pixel values which includes the averaged pixel values of the residual video image to provide a set of summed pixel values;
   wherein the decimating means deletes selected ones of the set of summed pixel values to provide the low resolution video signal.

5. An apparatus for forming a low resolution video signal according to claim 1, wherein
   the receiving means receives the encoded video signal and provides a block of high resolution frequency-domain video coefficient values to the down-conversion filter means;
   the down-conversion filter means receives the block of high resolution frequency-domain video coefficient values and generates a block of weighted frequency-domain video coefficients;
   the inverse-transform means transforms the block of weighted frequency-domain video coefficients into a first block of pixel values;
   the averaging filter means transforms the first block of pixel values into a second block of pixel values by transforming selected ones of the pixel values within the first block of pixel values into averaged pixel values; and
   decimating means for deleting selected ones of the pixel values from the second block of pixel values to provide the low resolution video signal.

6. An apparatus for forming a low resolution video signal according to claim 1, wherein
   the receiving means receives the encoded video signal and provides a block of high resolution frequency-domain video coefficient values to the down-conversion filter means;
   the down-conversion filter means receives the block of high resolution frequency-domain video coefficient values and generates a block of weighted frequency-domain video coefficients;
   the inverse-transform means transforms the block of weighted frequency-domain video coefficients into a first block of pixel values;
   the averaging filter means transforms the first block of pixel values into a second block of pixel values by transforming all of the pixel values within the first block of pixel values into averaged pixel values; and
   the decimating means deletes selected averaged pixel values of the second block of pixel values to provide the low resolution video signal.

7. An apparatus for forming a low resolution video signal according to claim 5, wherein the down-conversion filter means is equivalent to a block mirror filter in the spatial domain.

8. An apparatus for forming a low resolution video signal according to claim 5, wherein
   the receiving means provides an N×N block of high resolution frequency-domain video coefficient values to the down-conversion filter; and the averaging filter means processes pixel values according to the equation $$\alpha(2i) = \frac{x(2i) + x(2i+1)}{2}, \text{ for } i = 0, 1, \ldots, (N/2) - 1; \quad (1)$$

where x(i) represents input pixels in a horizontal row of the N×N block of pixel values and α (i) represents corresponding averaged pixel values and the second block of pixel values includes only averaged pixel values α (i) and thus, the averaging means includes the decimating means.

9. An apparatus for forming a low resolution video signal according to claim 1, wherein the averaging filter means is a bi-linear filter.

10. An apparatus for forming a low resolution video signal according to claim 5, wherein the encoded video signal represents a residual video image with motion prediction, the apparatus further comprising:
   memory means for storing a low resolution decimated video signal corresponding to a previous frame of the encoded video signal;
   up-sampling means for transforming the stored low resolution decimated video signal into a block of low resolution motion compensated video signal pixel values corresponding to the previous frame; and
   summing means for adding the block of low resolution motion compensated video signal pixel values corresponding to the previous frame to the second block of pixel values to provide a summed block of pixel values;
   wherein the decimating means deletes selected ones of pixel values from the summed block of pixel values to provide the low resolution video signal.

11. An apparatus for forming a low resolution video signal according to claim 10, wherein the upsampling means uses Lagrangian interpolation to transform the stored low resolution decimated video signal corresponding to the previous frame into the block of low resolution motion compensated video signal pixel values corresponding to the previous frame.

12. A method for forming a low resolution video signal from an encoded video signal representing a video image, the encoded video signal being a frequency-domain transformed high resolution video signal, the method comprising the steps of:
   (a) receiving the encoded video signal as a plurality of high resolution frequency-domain video coefficient values;
   (b) weighting a set of the plurality of high resolution frequency-domain video coefficient values to form a set of a respective plurality of low pass filtered frequency-domain video coefficients;
   (c) transforming the set of low pass filtered frequency-domain video coefficients into a first set of pixel values;
   (d) transforming selected ones of the pixel values in the first set of pixel values into averaged pixel values and providing a second set of pixel values including the averaged pixel values; and
   (e) deleting selected ones of the pixel values in the second set of pixel values to provide the low resolution video signal.

13. The method for forming a low resolution video signal according to claim 12, wherein in step (d) all of the pixel values in the first set of pixel values are transformed into averaged pixel values.

14. The method for forming a low resolution video signal according to claim 12, wherein in step (d) only the pixel values that are not later deleted in step (e) are transformed into averaged pixel values.

15. The method for forming a low resolution video signal according to claim 12, wherein the encoded video signal represents a residual video image with motion prediction, the method further comprising the steps of:
   adding a motion compensated video signal component of a previous frame to the second set of pixel values which includes the averaged pixel values of the residual video image to provide a set of summed pixel values;
   wherein selected ones of the set of summed pixel values are deleted to provide the low resolution video signal.

16. The method for forming a low resolution video signal according to claim 12, wherein
   in step (a), the encoded video signal is received as a block of high resolution frequency-domain video coefficient values representing a block of pixels of the video image;
   in step (b), the block of high resolution frequency-domain video coefficient values are weighted to form a block of weighted frequency-domain video coefficients;
   in step (c), the block of weighted frequency-domain video coefficients is transformed into a first block of pixel values;
   in step (d), selected ones of the pixel values within the first block of pixel values are transformed into averaged pixel values and a second block of pixel values which including averaged pixel values is provided; and
   in step (e) the non-averaged pixel values are deleted from the averaged block of pixel values to generate the low resolution video signal.

17. The method for forming a low resolution video signal according to claim 16, wherein
   in step (d), all of the pixel values within the first block of pixel values are transformed into averaged pixel values to reduce the motion artifacts; and
   in step (e), selected averaged pixel values of the second block of pixel values are deleted to generate the low resolution video signal.

18. The method for forming a low resolution video signal according to claim 16, wherein the weighting of the high resolution frequency-domain video coefficient values in step (b) is equivalent to block mirror filtering in the spatial domain.

19. The method for forming a low resolution video signal according to claim 16, wherein the encoded video signal represents a residual video image with motion prediction, the method further comprising the steps of:
   (f) storing a low resolution decimated video signal corresponding to a previous frame of the encoded video signal;
   (g) transforming the stored low resolution decimated video signal into a block of low resolution motion compensated video signal pixel values corresponding to the previous frame; and
   (h) adding the block of low resolution motion compensated video signal pixel values corresponding to the previous frame to the second block of pixel values to provide a summed block of pixel values;
   wherein in step (e), selected ones of pixel values from the summed block of pixel values are deleted to provide the low resolution video signal.

20. The method for forming a low resolution video signal according to claim 19, wherein in step (g), Lagrangian interpolation is used to transform the stored low resolution decimated video signal corresponding to the previous frame into the block of low resolution motion compensated video signal pixel values corresponding to the previous frame.

21. An apparatus for forming a low resolution video signal from an encoded video signal representing a video image, the encoded video signal being a frequency-domain transformed high resolution video signal, the apparatus comprising:

receiving means for receiving the encoded video signal as a plurality of high resolution frequency-domain video coefficient values;

down-conversion filter means for receiving and weighting selected ones of the plurality of high resolution frequency-domain video coefficient values to form a set of a respective plurality of frequency-domain video coefficients;

inverse-transform means for receiving and transforming the set of frequency-domain video coefficients into a first set of pixel values;

averaging filter means for receiving the first set of pixel values and transforming selected ones of the pixel values in the first set of pixel values into averaged pixel values to provide a second set of pixel values including the averaged pixel values; and decimating means for deleting selected ones of the pixel values in the second set of pixel values to provide the low resolution video signal.

* * * * *